United States Patent Office 3,292,919
Patented Dec. 20, 1966

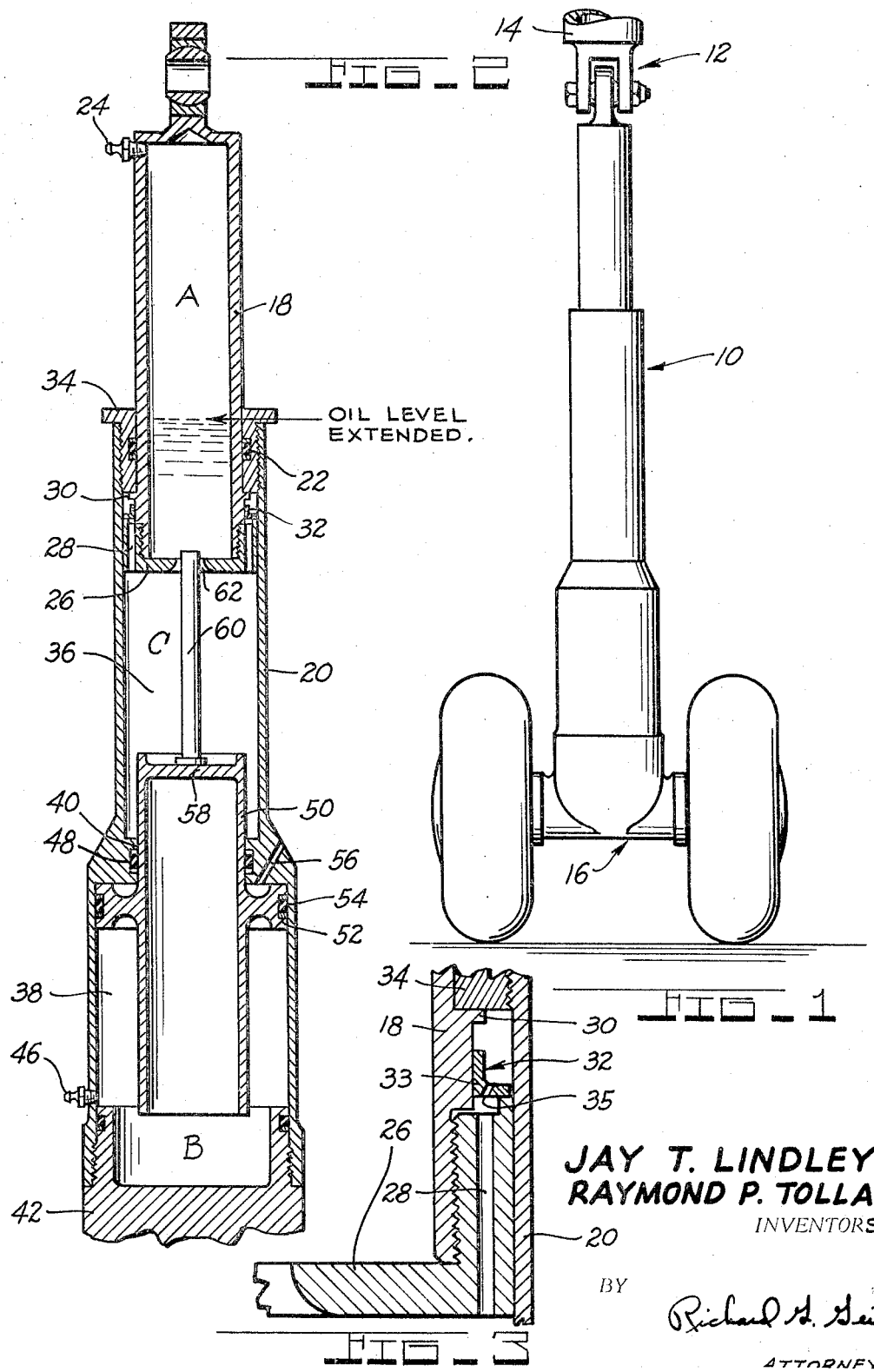

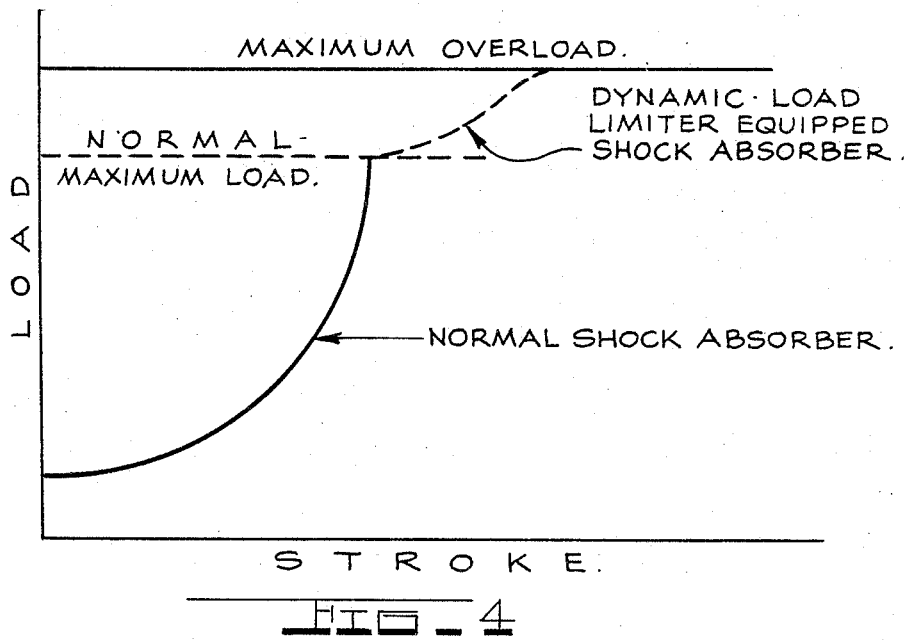
FIG_4
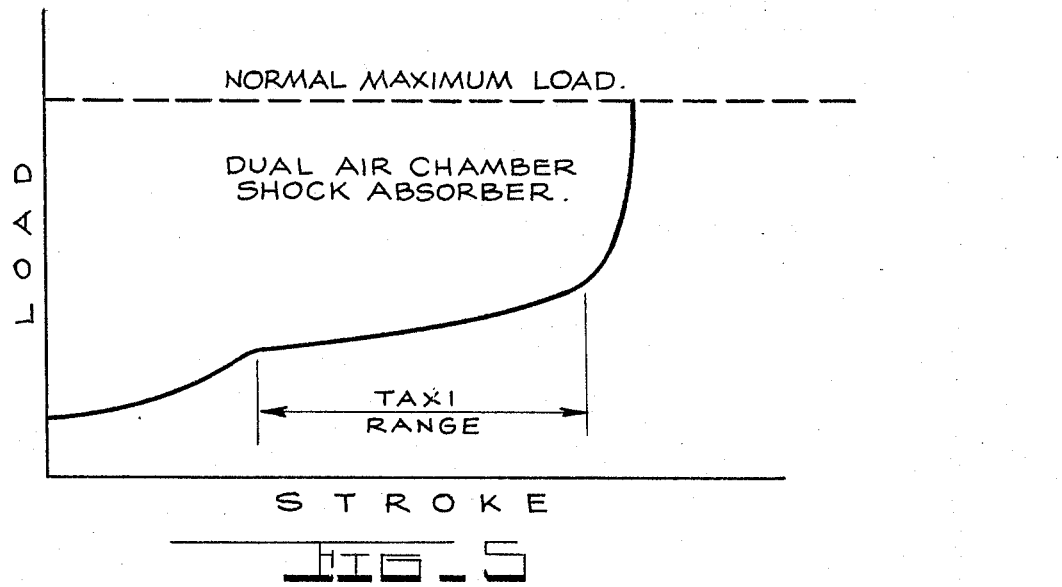
FIG_5
JAY T. LINDLEY.
RAYMOND P. TOLLAR.
INVENTORS

3,292,919
AIRCRAFT SHOCK ABSORBER
Jay T. Lindley and Raymond P. Tollar, both of South Bend, Ind., assignors to The Bendix Corporation, South Bend, Ind., a corporation of Delaware
Filed Dec. 21, 1964, Ser. No. 419,955
1 Claim. (Cl. 267—64)

This invention relates to an aircraft shock absorber, and more particularly to a shock absorber which has provisions for limiting the dynamic load thereon when the demand for stroking velocity exceeds the maximum design velocity as controlled by a shock absorbing media.

It is a principal object of this invention to provide a shock absorber which operates as a normal shock absorber when velocities and/or loads are within normal design limits and which allows additional stroke and/or velocities when abnormal conditions are encountered.

It is a further object of this invention to provide a shock absorber which does not produce fluid metering during overload limiter operation.

Still another object of this invention is to maintain rebound control within a shock absorber for the total stroke including the additional stroke when abnormal conditions are encountered.

It is also an object of this invention to provide a shock absorber which allows additional stroke and/or velocities when abnormal conditions are encountered which is operative during any portion of the stroke of the shock absorber.

Other objects and advantages of our invention will be readily understood by those skilled in the art from the following description of the accompanying drawings in which:

FIGURE 1 is a view of shock absorber embodying principles of our invention;

FIGURE 2 is a cross sectional view of the shock absorber of FIGURE 1 showing the shock absorber in an extended position;

FIGURE 3 is an exploded cross sectional view of the snubbing mechanism provided with our shock absorber;

FIGURE 4 is a load stroke curve illustartive of the operation of our shock absorber; and FIGURE 5 is a load stroke curve illustrative of another operation of our shock absorber.

Although the present wheel assembly and principles employed therein can find extensive use in other fields and industries, it is essentially designed and intended for use as a landing gear unit in an aircraft or airplane and this adaptation and use thereof is specifically illustrated and described herein. The teachings of the present invention are applicable to the tail, nose or main landing gear of an airplane, but for illustrative purposes and for an understanding of the invention, it is shown and described in connection with the nose landing gear customarily mounted forwardly of an aircraft.

As the size of airplanes has increased, the diameters of the wheels of the main landing gear unit have also increased without any proportional or corresponding increase in the size of compartments into which the landing gears are to be retracted. Moreover, the high speeds presently attainable by aircraft utilize or require wings of constantly diminishing maximum thickness. Thus, the factors of speed and/or size have been respectively responsible for a reduction of the space available for the retraction of the landing gear and for an increase in size (diameter as well as cross sectional area) of the landing gear wheels employed to support the airplane and to resist the impact of landing resulting from high landing speeds and/or the weight of the airplane.

Now with particular reference to FIGURE 1, we show a shock absorber 10 mounted as at 12 to a lug 14 depending from an aircraft. The shock absorber is provided with means at the end opposite its mounting with lug 14 to carry a wheel and axle assembly 16.

As may be more particularly seen in FIGURE 2, the shock absorber is constructed with an upper telescoping tube 18 and a lower telescoping tube 20 so that the upper tube 18 is slidable within the lower tube 20. The lower tube 20 is provided with a seal 22 which cooperates with the outer surface of the upper tube 18.

Referring first to the upper tube assembly, it is provided with an opening adjacent the uppermost area thereof within which a gas charging fitting 24 is assembled. The lowermost surface of the tube 18 is formed as a piston face 26 having radially arranged and spaced openings 28 which lead from one side of the face to the other side, or rear side of the piston. The tube 18 is also provided with a radially extending flange 30 axially spaced along the tube with respect to the piston face 26 to form a stop for limiting axial travel of the tube 18 within the tube 20. The flange 30 also acts as a stop for a snubber valve 32 assembled circumferentially of the tube 18 between the piston face 26 and the flange 30. The snubber valve and its arrangement with respect to the piston 26 is more particularly seen in FIGURE 3. The snubber valve 32 comprises a channel-shaped ring 33 provided with orifices 35 which are arranged to register with the radial openings 28 in the piston 26. This channel-shaped ring may be inserted over the tube 18 prior to assembly of face 26 and subsequent assembly within the tube 20, as by threading a gland nut 34 within the open end of the tube 20, as seen in FIGURE 2.

The lower tube 20 is constructed to have two chambers 36 and 38 separated by a partition 40. The lower end of the tube 20 is formed with an end closure 42 to which is mounted the axle assembly 16, aforementioned. Upwardly from the assembled position of the plug or end closure 42 within the lower chamber 38 there is provided an opening in the wall of tube 20 into which a gas charging fitting 46 is inserted. The partition 40 is grooved to allow for the insertion therewithin of an annular seal 48 which cooperates with an outer surface of a reciprocable tube 50 to seal the chambers 36 and 38 from each other. As seen, the tube 50 is provided with a radially extending flange 52 that is grooved to receive an annular seal 54 which cooperates with the inner walls of tube 20 to divide chamber 38 into an upper and lower portion. The upper portion is communicated to atmosphere via an angular passage 56 through the tubular member 20 to preclude a pressure lock. The tube 50 is closed at its upper end by means of a partition 58 which also mounts a metering pin 60 in such a manner as to be aligned with an opening 62 within the piston 26 of tube 18.

As seen, the metering pin 60 is of constant diameter from end to end. However, if it is desired the metering pin could be constructed of tapered form to variably restrict the opening 62 in accordance with the position of the pin.

Thus, it is seen that the shock absorber 10 is divided so as to have an upper air chamber A, a lower air chamber B and a dynamic chamber C in controlled communication with air chamber A.

In operation, as by the impacting of the ground by the aircraft wheel assembly, or by the striking of an obstacle thereon by same, the lower tube 20 is caused to stroke upwardly to compress the air above an oil level that completely fills the dynamic chamber C and extends partially into chamber A, as shown in FIGURE 2. This compressing is caused by exhausting fluid within the chamber 36 to the air chamber A of tube 18 through the orifice 62 as permitted by the metering pin 60. As may be readily realized by those skilled in the art to which our invention relates, the maximum permissible stroke for cylinder 20 is normally limited by the pressure of the air within the air chamber A.

In addition, the fluid in the dynamic chamber C, chamber 36, enters the radial passages 28 and impinges upon the snubber ring 32 to cause it to be removed from the rear face of piston 26 to allow fluid to flow around the ring 32 as well as through orifice 35 into an expanding area behind the piston 26 and below the gland nut 34.

As the tube 20 telescopes over the tube 18, the dynamic pressure in chamber C increases due to oil exhausting from chamber C through the metering orifice. If the dynamic pressure, which is determined by velocity and relative movement together, exceeds a predetermined value, as would occur upon the subjecting of the wheel assembly to obstacles after the shock absorber has been fully compressed or as would occur upon experiencing a stroking velocity during the compression of the shock absorber which is of a higher rate than that designed for, the tube 20 will continue to move upwardly with the dynamic pressure in chamber C acting upon the tube 50 to compress the air within chamber B. The resulting increase in air pressure in chamber B will cause a relatively small increase in dynamic pressure in chamber C, thus limiting the dynamic load developed in chamber C to a specified maximum.

After the removal of the excess loading, the cylinder 20 will tend to be extended away from tube 18, which rate of extension is dependent upon the return of flow through the radial passages 28 as permitted by the limited orifice 35 in the snubber ring 32. Whenever the cylinder 20 is stroked by excess loading, the metering pin 60 remains relatively immovable with respect to the orifice 62 so that fluid is not metered thereby into the air chamber A.

Snubbing action will occur upon relief of the shock absorber from the loading which would tend to compress it normally, as well as under excess loading in the arrangement we have shown.

We have tried to express one function of our shock absorber graphically in FIGURE 4 which shows a solid line curve which is developed for a load stroke relationship of a normal shock absorber and when it is equipped with our dynamic load limiter, the normal maximum load may be exceeded developing a load stroke relationship as shown by the dash line curve.

In accomplishing the above function, we have provided higher static air pressure in chamber B than in chamber A. However, when the reverse is true we have found that other favorable features are present which will allow shcok absorber movement without metering of hydraulic fluid in rough terrain. In more detail, by charging chamber A and B equally we will develop a small load for a given small stroke until pressure in "A" is greater than "B." Thereafter cylinder 20 will reciprocate without metering fluid until the pressure in "B" builds up to that of "A" or until the tube 50 bottoms on cylinder 20. During this movement of cylinder 20, the increase in load is slight. Afterwards, the load-stroke relationship assumes a greater rise, as seen in FIGURE 5.

It may thus be readily concluded by those skilled in the art to which our invention relates that our principal objects have been accomplished by the aforegoing description of a preferred form of our invention. However, it is not to be construed that this is the only form in which our invention may take to accomplish the desired results we have shown. Therefore, we do not wish to be limited to the embodiments shown in compliance with the applicable patent law but rather intend that our invention be solely limited in the scope of its disclosure to the appended claim.

We claim:

A dynamic load limiting shock absorber comprising:

a first tubular member arranged to be fixed with respect to surrounding structure and provided with means for charging the interior thereof with a compressible fluid, said first tube also having a piston on one end thereof which piston is provided with radial openings and a central opening, said radial openings leading to an area exterior of said first tube and said central opening leading to the inner area of said tube, said first tubular member also being provided with a radial flange spaced from and immediately behind said piston;

a second tubular member whose inner diameter is sized to slidably receive said piston of said first tubular member through an open end in said second tubular member which open end is threaded to receive a gland nut which cooperates with the radial flange of said first tubular member to limit the extension of said first tubular member from said second tubular member and to hold said first tubular member within said second tubular member, said second tubular member being divided into two chambers with a partition therebetween with the lowermost chamber being closed by an end plug and being provided with a compressible fluid charging means;

a third tubular member reciprocably mounted within said second tubular member through said partition, said second tubular member having mounted thereon a metering pin arranged to cooperate with the orifice in the piston of said first tubular member upon the compression of said second tubular member over said first tubular member, said third tubular member being provided with a movable wall operative in one of the chambers of said second tubular member and subjected to the compressive fluid therewithin so as to hold said metering pin immobile while permitting said second tubular member to compress as aforementioned over said first tubular member; and a snubbing means operative with said radial passages in said piston exterior of said first tubular member to readily permit fluid flow in one direction and restrict fluid flow in a return direction to continuously dampen the extension of said second tubular member with respect to said first tubular member.

References Cited by the Examiner
UNITED STATES PATENTS 2,363,485  11/1964  Down _____ 267—64

ARTHUR L. LA POINT, *Primary Examiner.*

R. H. WOHLFARTH, *Assistant Examiner.*